US010222808B2

United States Patent
Bardinet et al.

(10) Patent No.: US 10,222,808 B2
(45) Date of Patent: Mar. 5, 2019

(54) INSPECTION SYSTEM AND METHOD FOR PERFORMING INSPECTIONS IN A STORAGE FACILITY

(71) Applicant: BALYO, Moissy-Cramayel (FR)

(72) Inventors: Fabien Bardinet, Issy les Moulineaux (FR); Pierre Bureau, Levallois-Perret (FR)

(73) Assignee: BALYO, Moissy-Cramayel (FR)

( * ) Notice: Subject to any disclaimer, the term of this patent is extended or adjusted under 35 U.S.C. 154(b) by 46 days.

(21) Appl. No.: 15/458,621

(22) Filed: Mar. 14, 2017

(65) Prior Publication Data

US 2017/0269613 A1    Sep. 21, 2017

(30) Foreign Application Priority Data

Mar. 18, 2016 (EP) .................................... 16161062

(51) Int. Cl.
  *G05D 1/12* (2006.01)
  *B64C 39/02* (2006.01)
  (Continued)

(52) U.S. Cl.
  CPC ............. *G05D 1/12* (2013.01); *B64C 39/024* (2013.01); *B64D 47/08* (2013.01); *B64F 1/007* (2013.01);
  (Continued)

(58) Field of Classification Search
  CPC ... G05D 1/12; G05D 1/00; G05D 1/02; B64C 29/00; B64C 39/02; G08G 5/00; G06Q 10/08
  (Continued)

(56) References Cited

U.S. PATENT DOCUMENTS

2014/0277691 A1* 9/2014 Jacobus ............... G06Q 10/087
                                                      700/216
2014/0277854 A1* 9/2014 Jones ..................... G05D 1/102
                                                      701/3
(Continued)

FOREIGN PATENT DOCUMENTS

EP            2335124 A1    6/2011
WO   WO 2015/035428 A2    3/2015

OTHER PUBLICATIONS

"Drone Ready?", Drone Readiness Whitepaper, Nov. 24, 2014 by Jasper Pons, www.scanman.co.za.
"Eyesee: the drone allowing to automate inventory in warehouses", Logistics Solutions, https://web.archieve.org/web/20151011095438/http://www.hardis-g; Oct. 11, 2015.

*Primary Examiner* — Thomas G Black
*Assistant Examiner* — Wae L Louie
(74) *Attorney, Agent, or Firm* — Miller, Matthias & Hull LLP

(57) ABSTRACT

An inspection system for a storage facility including an automatic guided vehicle with a bidimensional positioning system, an unmanned aerial vehicle with a measurement sensor, a position control system to maintain the unmanned aerial vehicle above the automatic guided vehicle, an altitude sensor to acquire a relative vertical distance between the unmanned aerial vehicle and the automatic guided vehicle, and a communication system to transmit the measurement data to a remote server. The inspection system transmits to the remote server a set of tridimensional coordinates associated with the measurement data comprising horizontal coordinates function of the bidimensional location of the automatic guided vehicle on the floor of the storage facility and a vertical coordinate function of the relative vertical distance of the unmanned aerial vehicle with respect to the automatic guided vehicle.

14 Claims, 3 Drawing Sheets

(51) Int. Cl.
*B64D 47/08* (2006.01)
*B64F 1/00* (2006.01)
*B66F 9/06* (2006.01)
*G01C 21/18* (2006.01)
*G05D 1/02* (2006.01)
*G05D 1/04* (2006.01)
*G05D 1/10* (2006.01)

(52) U.S. Cl.
CPC .............. *B66F 9/063* (2013.01); *G01C 21/18* (2013.01); *G05D 1/024* (2013.01); *G05D 1/0276* (2013.01); *G05D 1/042* (2013.01); *G05D 1/101* (2013.01); *G05D 1/102* (2013.01); *B64C 2201/108* (2013.01); *G05D 2201/0216* (2013.01)

(58) Field of Classification Search
USPC ............................................................ 701/3
See application file for complete search history.

(56) References Cited

U.S. PATENT DOCUMENTS

| | | | |
|---|---|---|---|
| 2017/0192424 A1* | 7/2017 | Poole | H04N 7/183 |
| 2017/0193829 A1* | 7/2017 | Bauer | H04N 7/183 |
| 2017/0269613 A1* | 9/2017 | Bardinet | B64C 39/024 |
| 2018/0002010 A1* | 1/2018 | Bauer | B64C 29/0025 |
| 2018/0003161 A1* | 1/2018 | Michini | F03D 17/00 |

* cited by examiner

INSPECTION SYSTEM AND METHOD FOR PERFORMING INSPECTIONS IN A STORAGE FACILITY

CROSS-REFERENCE TO RELATED APPLICATION

This application claims priority under 35 U.S.C. § 119 and the Paris Convention to European Patent Application No. 16161062.1 filed on Mar. 18, 2016.

FIELD OF THE DISCLOSURE

The instant invention relates to inspection systems and methods for performing inspections in a storage facility.

BACKGROUND OF THE INVENTION DISCLOSURE

Unmanned, aerial vehicles have found growing uses in storage facilities for survey and control tasks such as inspection of facility content, inspection of the storage building itself or surveillance operations.

In the present description, the term "storage facility" is understood as an area, which can be an indoor or outdoor area, intended for the storage of products Such a "storage facility" is thus, in general, distinguished from a store, in which products are sold, and a factory, in which products are transformed.

Survey and control tasks involve acquiring some information about an object located at a specific physical location of the facility. These operations where previously mostly done by manual examination. An employee would then travel around the warehouse to record such information.

Unmanned aerial vehicles allows for increasing productivity, improving logistic management and reducing the cost of such tasks. Unmanned aerial vehicles (UAV) can easily travel through a storage facility and acquire measurement data giving information about products stored in the facility.

However, the determination of the tridimensional position of an UAV inside a storage facility can be a difficult task.

In addition to the inherent complexity of three-dimensional positioning, storage facilities are usually shared between human and automatic machines and are thus known to be dynamic environments comprising many movable and unpredictable elements (for instance boxes temporary stored in the facility).

Such unpredictable elements strongly complicate three-dimensional positioning of UAV and current solutions mainly involve the use of a human operator to locate and control the unmanned aerial vehicle or the use of additional reference target in the facility to help locate the UAV.

The present invention aims at improving this situation.

SUMMARY OF THE INVENTION DISCLOSURE

To this aim, a first object of the invention is an inspection system for a storage facility, the storage facility having a floor extending along a horizontal plane, a vertical direction being perpendicular to said horizontal plane, the inspection system comprising:
  an automatic guided vehicle comprising
    a propulsion unit able to propel the automatic guided vehicle on the floor of the storage facility, and
    a bidimensional positioning system able to determine a bidimensional location of the automatic guided vehicle in the horizontal plane on the floor of the storage facility,
  an unmanned aerial vehicle comprising
    a propulsion unit able to propel the unmanned aerial vehicle and
    a measurement sensor able to acquire measurement data,
  wherein the inspection system further comprises:
    a position control system able to command the propulsion unit the unmanned aerial vehicle to maintain said unmanned aerial vehicle substantially above the automatic guided vehicle in the vertical direction,
    an altitude sensor able to acquire relative vertical positioning data indicative of a relative vertical distance between the unmanned aerial vehicle and the automatic guided vehicle,
    a communication system able to transmit the measurement data to a remote server,
  wherein the inspection system is further able to transmit to said remote server a set of tridimensional coordinates associated with the measurement data, said set of tridimensional coordinates comprising
    a set of horizontal coordinates function of said bidimensional location of the automatic guided vehicle in the horizontal plane on the floor of the storage facility, and
    a vertical coordinate function of said relative vertical distance of the unmanned aerial vehicle with respect to the automatic guided vehicle.

In some embodiments, one might also use one or more of the following features:
  the position control system comprises:
    a position control sensor able to acquire relative horizontal positioning data indicative of a relative position of the automatic guided vehicle with respect to the unmanned aerial vehicle in the horizontal plane,
    a computer able to receive said relative horizontal positioning data from the position control sensor and to command the propulsion unit of the unmanned aerial vehicle to maintain said unmanned aerial vehicle substantially above the automatic guided vehicle in the vertical direction;
    said position control sensor and said computer are onboard the unmanned aerial vehicle;
    said position control sensor comprises a camera, and a reference target is mounted on the automatic guided vehicle, said reference target comprising a set of features visible to the position control sensor;
  the position control system comprises at least one gyroscope and/or accelerometer onboard the unmanned aerial vehicle, and
  the position control system is able to stabilize a spatial orientation of the unmanned aerial vehicle, in particular a roll, a pitch and/or a yaw of the unmanned aerial vehicle;
  the measurement sensor of the unmanned aerial vehicle comprises an optical, laser, video or acoustic sensor, in particular the measurement sensor of the unmanned aerial vehicle is a short range measurement sensor;
  the automatic guided vehicle is a forklift automatic guided vehicle,
  in particular the reference target is provided on a platform mounted on at least one fork of said forklift automatic guided vehicle;
  said platform further is a landing platform for the unmanned aerial vehicle;
  the bidimensional positioning system of the automatic guided vehicle comprises:
    at least one storage facility positioning sensor onboard the automatic guided vehicle able to acquire storage facility positioning data of the automatic guided vehicle in the storage facility, and a computer system onboard the automatic guided vehicle able to receive said storage facility positioning data and to determine a bidimensional location of the automatic guided vehicle in the horizontal plane on the floor of the storage facility;

the computer system of the automatic guided vehicle is able to command the propulsion unit of the automatic guided vehicle to travel automatically across an inspection area of the storage facility;

the position control system of the unmanned aerial vehicle is able to command the propulsion unit of the unmanned aerial vehicle to scan automatically a vertical extension of the inspection area of the storage facility above the automatic guided vehicle;

the unmanned aerial vehicle is able to follow a movement of the automatic guided vehicle in the storage facility, in particular the unmanned aerial vehicle doesn't perform a tridimensional positioning with respect to the storage facility.

Another object of the invention is a method for performing an inspection in a storage facility, the storage facility having a floor extending along a horizontal plane, a vertical direction being perpendicular to said horizontal plane, the method comprising:

providing an inspection system as detailed above, propelling the automatic guided vehicle on the floor of the storage facility, propelling the unmanned aerial vehicle and maintaining said unmanned aerial vehicle substantially above the automatic guided vehicle in the vertical direction, acquiring measurement data by means of a measurement sensor of the unmanned aerial vehicle, determining a bidimensional location of the automatic guided vehicle in the horizontal plane on the floor of the storage acquiring relative vertical positioning data indicative of a relative vertical distance between the unmanned aerial vehicle, and the automatic guided vehicle, transmitting to a remote server said measurement data, and transmitting to said remote server a set of tridimensional coordinates associated with the measurement data, said set of tridimensional coordinates comprising a set of horizontal coordinates function of said bidimensional location of the automatic guided vehicle in the horizontal plane on the floor of the storage facility, and a vertical coordinate function of said relative vertical distance of the unmanned aerial vehicle with respect to the automatic guided vehicle.

According to an embodiment, maintaining said unmanned aerial vehicle substantially above the automatic guided vehicle in the vertical direction comprises:

acquiring relative horizontal positioning data indicative of a relative position of the automatic guided vehicle with respect to the unmanned aerial vehicle in the horizontal plane, and commanding the propulsion unit of the unmanned aerial vehicle to maintain said unmanned aerial vehicle substantially above the automatic guided vehicle in the vertical direction.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION OF THE DISCLOSURE

Figure 1:
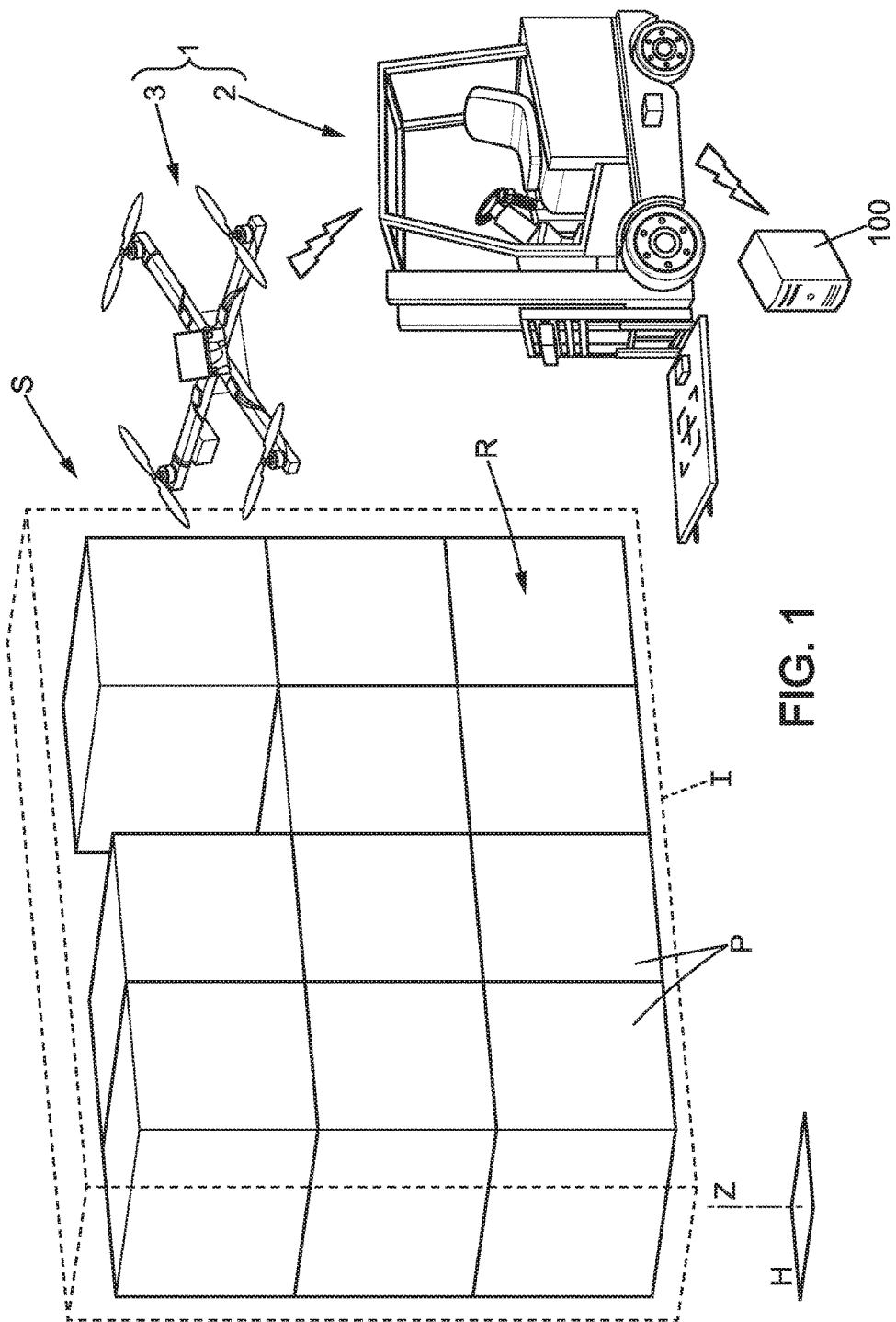
FIG. 1 is a schematic view in perspective of a inspection system for a storage facility comprising an automatic guided vehicle and an unmanned aerial vehicle according to an embodiment of the invention.

FIG. 1 illustrates an embodiment of an inspection system 1 for a storage facility S according to an embodiment of the invention, An example of a storage facility S in which the inspection system 1 of the present invention may be used is shown in FIG. 1.

The storage facility S has a floor F extending along a horizontal plane H.

A vertical direction Z can also be defined being perpendicular to said horizontal plane H.

The storage facility S may for instance contain multiple stacks of products P which are arranged in a number of rows R or lanes. The rows may for instance be arranged on either side of a main aisle, and a plurality of support columns may be located between the rows.

The inspection system 1 comprises an Automatic Guided Vehicle 2, also called an AGV, and an Unmanned Aerial Vehicle 3, also called an UAV.

Figure 2:
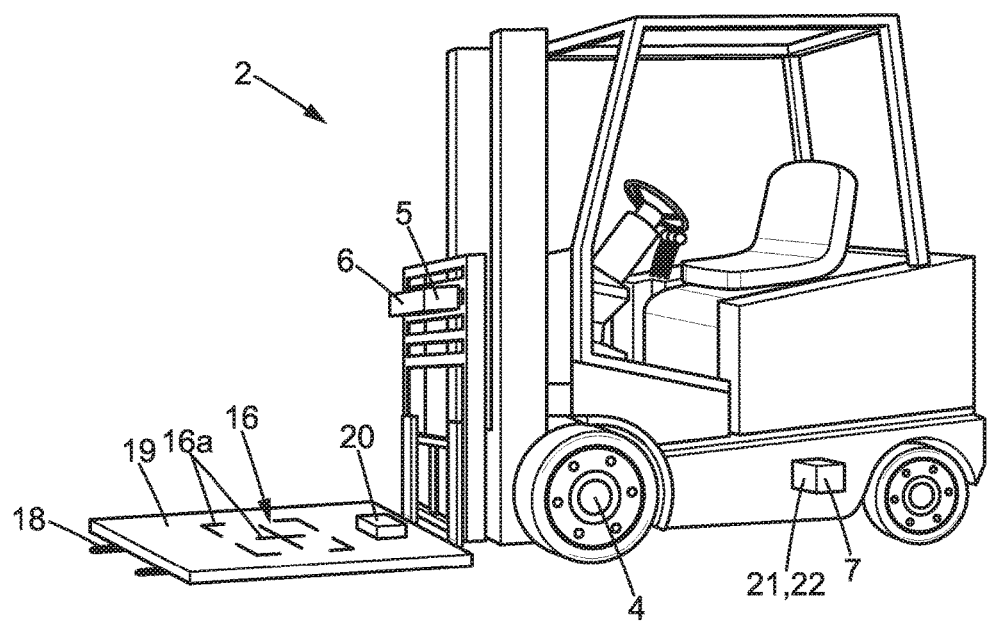
FIG. 2 is a detailed schematic view in perspective of the automatic guided vehicle of the inspection system of FIG. 1.

The automatic guided vehicle 2 is illustrated in greater details on FIG. 2.

The automatic guided vehicle 2 comprises a propulsion unit 4 able to propel the automatic guided vehicle 2 on the floor F of the storage facility S.

The propulsion unit 4 may for instance comprise a motor 4a, for instance a thermal or electrical motor, and gripping means 4b such as wheels or tracks.

The automatic guided vehicle 2 further comprises a bidimensional positioning system 5.

The bidimensional positioning system 5 is able to determine a bidimensional location of the automatic guided vehicle 2 in the horizontal plane H on the floor F of the storage facility S.

The bidimensional positioning system 5 of the automatic guided vehicle 2 may for instance comprises at least one storage facility positioning sensor 6 and a computer system 7.

The storage facility positioning sensor 6 is located onboard the automatic guided vehicle 2 and is able to acquire storage facility positioning data of the automatic guided vehicle 2 in the storage facility S.

The storage facility positioning sensor 6 may for instance be a laser rangefinder such as a light detection and ranging (LIDAR) module, a radar module, an ultrasonic ranging module, a sonar module, a ranging module using triangulation or any other device able to acquire the distance or the position of a single or a plurality of points of the environment.

In a preferred embodiment, the storage facility positioning sensor 6 emits an emitted physical signal and receives a reflected physical signal. The sensor then computes a range, corresponding to a distance from the sensor to a single or a plurality of environment points, by comparing the emitted signal and the reflected signal, for instance by comparing the time of emission and the time of reception. The emitted and reflected physical signals can be for instance light beams, electromagnetic waves or acoustic waves.

The storage facility positioning data may thus include a set of environment points location around the automatic guided vehicle 2.

The computer system 7 is able to receive the storage facility positioning data from the storage facility positioning sensor 6 and to determine a bidimensional location BL of the automatic guided vehicle 2 in the horizontal plane H on the floor F of the storage facility S. The computer system 7 may also be located onboard the automatic guided vehicle 2.

To this aim, the computer system 7 may for instance operate a simultaneous localization and mapping (SLAM) algorithm. Such algorithms are used to build a map of the surroundings of a robot in real time and to compute a localisation of the robot based on this map.

A predefined map of the facility, in particular of the floor of the facility, may be stored in a memory of the automatic guided vehicle 2 and the computer system 7 may be able to compute a bidimensional position of the automatic guided vehicle 2 in the storage facility S by comparing a reconstructed map with the map stored in memory.

It should be noted that the task of locating an automatic guided vehicle on a bidimensional plane such as the floor of a facility is notably easier than the task of positioning an unmanned aerial vehicle in a three dimensional space inside the facility.

Having determined a bidimensional position of the automatic guided vehicle 2, the computer system 7 may further be able to command the propulsion unit 4 of the automatic guided vehicle 2 to travel automatically across an inspection area I of the storage facility S.

Figure 3:
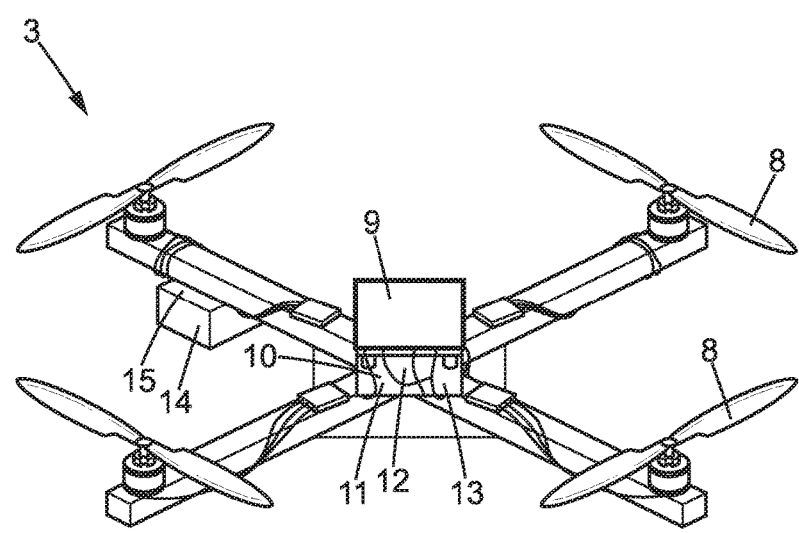
FIG. 3 is a detailed schematic view in perspective of the unmanned aerial vehicle of the inspection system of FIG. 1.
Figure 4:
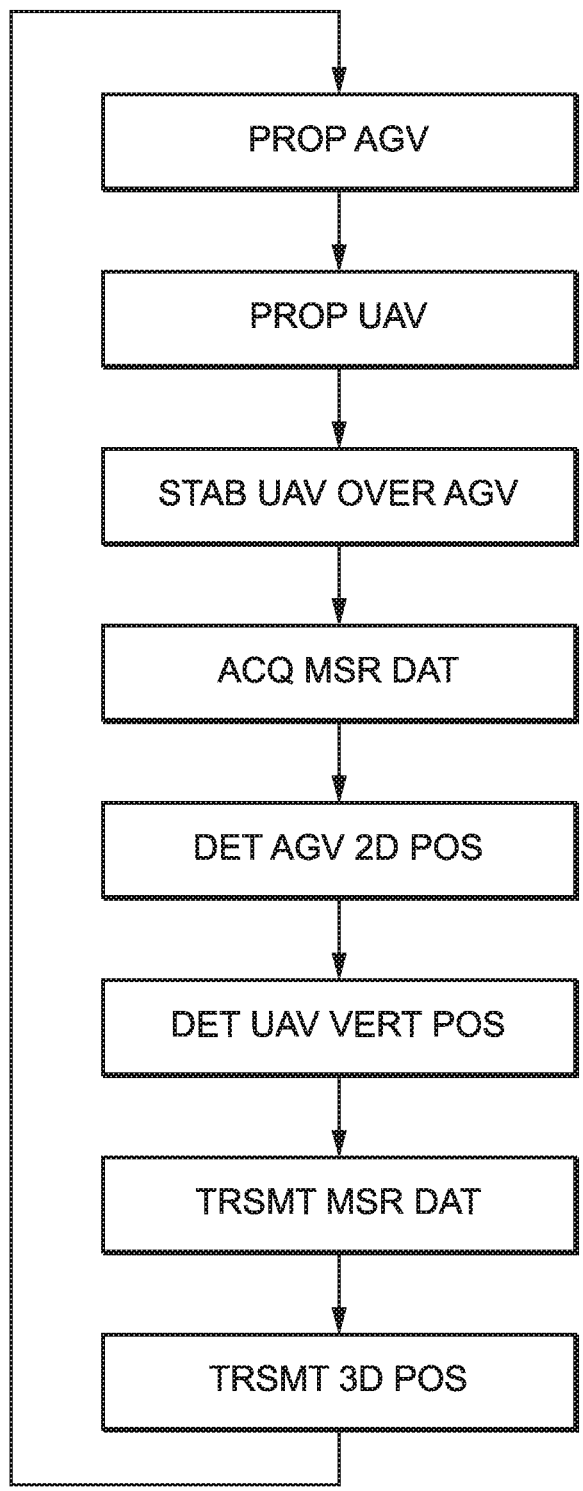
FIG. 4 is a flowchart detailing a method for performing an inspection in a storage facility according to an embodiment of the invention.

The unmanned aerial vehicle 3 is illustrated in greater details on FIG. 3 and comprises a propulsion unit 8 and a measurement sensor 9.

The propulsion unit 8 is able to propel the unmanned aerial vehicle 3. The propulsion unit 8 of the unmanned aerial vehicle 3 may for instance include one or more rotors and the unmanned aerial vehicle 3 may be a copter or multicopter.

The measurement sensor 9 is able to acquire measurement data.

The measurement sensor 9 of the unmanned aerial vehicle may comprise an optical, laser, video or acoustic sensor. The measurement sensor 9 may thus be a camera or recording device that may capture or record an image(s), such as photographic, video, and/or digital images, or a sensor that detects bar codes or otherwise receives information, such as, for example, detects a radio frequency signal and/or information contained therein.

In an embodiment of the invention, the measurement sensor 9 is a short range measurement sensor, for instance with a range of less than three meters.

The measurement sensor 9 may be operably connected to a control unit 10 onboard the unmanned aerial vehicle 3.

The control unit 10 may comprise a computer 11, a memory 12, and a communication module as shown in FIG. 3.

The memory 12 may or may not be part of the computer 11. The memory 12 may store programming, instructions, or other information that is used or executed by the computer 11.

The memory 12 is able to store measurement data acquired by the measurement sensor 9. Suitable memories 12 include, but are not limited to, permanent memory, RAM, ROM, or a hard drive, among others.

The communication module 13 may be a wireless communication unit.

The computer 11 may be used to operate the measurement sensor 9 as well as the unmanned aerial vehicle 3.

In particular, the unmanned aerial vehicle 3 may comprise a position control system 14 able to command the propulsion unit 8 the unmanned aerial vehicle 3.

The position control system 14 of the unmanned aerial vehicle 3 may be able to command the propulsion unit 8 of the unmanned aerial vehicle 3 to scan automatically a vertical extension of the inspection area I of the storage facility S above the automatic guided vehicle 2.

To this aim, the position control system 14 may control the propulsion unit 8 to repeatedly make the unmanned aerial vehicle 3 move up and down along the vertical direction Z, with regard to the automatic guided vehicle 2, while staying vertically above the automatic guided vehicle 2.

The position control system 14 may in particular be able to maintain said unmanned aerial vehicle 3 substantially above the automatic guided vehicle 2 in the vertical direction Z.

By "maintain the unmanned aerial vehicle substantially above the automatic guided vehicle in the vertical direction Z", it is meant that the unmanned aerial vehicle stay above the automatic guided vehicle but may also slightly depart from the vertical of the automatic guided vehicle, in particular as a result of a movement of the unmanned aerial, vehicle 3 or the automatic guided vehicle 2 that may take some time to be compensated by the position control system 14.

In particular, the unmanned aerial vehicle 3 is able to follow a movement of the automatic guided vehicle 2 in the storage facility S, in particular on the floor of the storage facility S. As mentioned above, the unmanned aerial vehicle 3 may take some delay to follow the automatic guided vehicle 2.

To this aim, the position control system 14 comprises a position control sensor 15 and the computer 11. The position control sensor 15 and the computer 11 may in particular be located are onboard the unmanned aerial vehicle 3.

The position control sensor 15 is able to acquire relative horizontal positioning data indicative of a relative position of the automatic guided vehicle 2 with respect to the unmanned aerial vehicle 3 in the horizontal plane H.

In one embodiment of the invention, the position control sensor 15 may comprise a camera.

A reference target 16 may then be mounted on the automatic guided vehicle 2.

The reference target 16 may comprises a set of features 16*a* visible to the position control sensor 15. The set of features 16*a* may for instance be a series of lines drawn on a platform 19 as detailed hereafter.

The computer 11 is able to receive the relative horizontal positioning data from the position control sensor 15. The computer 11 is then able to command the propulsion unit 8 of the unmanned aerial vehicle 3 to maintain said unmanned aerial vehicle 3 substantially above the automatic guided vehicle 2 in the vertical direction Z.

To this aim, the computer 11 may determine a horizontal relative position of the unmanned aerial vehicle 3 with regards to the automatic guided vehicle 2.

The computer 11 may then implement a feedback loop to command the propulsion unit 8 of the unmanned aerial vehicle 3 in function of the horizontal relative position, in order to maintain the unmanned aerial vehicle 3 substantially above the automatic guided vehicle 2.

The position control system 14 comprises orientation detection means 17 onboard the unmanned aerial vehicle 3, such as at least one gyroscope and/or accelerometer.

The position control system 14 may then be able to stabilize a spatial orientation of the unmanned aerial vehicle 3, in particular a roll, a pitch and/or a yaw of the unmanned aerial vehicle 3.

This way, the accuracy of determination of the horizontal relative position of the unmanned aerial vehicle 3 with regards to the automatic guided vehicle 2 may be improved.

In one embodiment, the automatic guided vehicle 2 may be a forklift automatic guided vehicle comprising at least one fork 18.

In this embodiment, the reference target 16 can be provided on a platform 19 mounted said fork 18 of said forklift automatic guided vehicle 2.

The platform 19 may further be a landing platform for the unmanned aerial vehicle 3.

The inspection system 1 further comprises an altitude sensor 20 able to acquire relative vertical positioning data indicative of a relative vertical distance between the unmanned aerial vehicle 3 and the automatic guided vehicle 2.

The altitude sensor 20 may for instance be a distance-measuring sensor, for instance a laser rangefinder such as a light detection and ranging (LIDAR) module, a radar module, an ultrasonic ranging module, a sonar module, a ranging module using triangulation or any other device able to acquire the relative distance of a single or a plurality of points of the environment.

The altitude sensor 20 may be mounted on the automatic guided vehicle 2 or on the unmanned aerial vehicle 3.

The inspection system 1 also comprises a communication system 21 able to transmit the measurement data to a remote server 100.

The remote server 100 is for instance a ground based unmovable server located in the storage facility S.

The communication system 21 may in particular be a wireless communication unit, for instance a radiofrequency communication unit.

The communication system 21 may be mounted on the automatic guided vehicle 2 or on the unmanned aerial vehicle 3.

If the communication system 21 is mounted on the unmanned aerial vehicle 3, the communication system 21 may for instance be part of the communication module 13 of the unmanned aerial vehicle 3.

The automatic guided vehicle 2 and the unmanned aerial vehicle 3 may be able to communicate together and with the remote server 100.

In particular, the automatic guided vehicle 2 may comprise a communication module 22 able to communicate with the communication module 13 of the unmanned aerial vehicle 3.

The communication module 22 may be a wireless communication unit.

In one embodiment of the invention, one of the automatic guided vehicle 2 and the unmanned aerial vehicle 3 may be a master vehicle controlling the other one of the automatic guided vehicle 2 and the unmanned aerial vehicle 3.

In another embodiment, the operation of the inspection system 1 may be decentralized and both the automatic guided vehicle 2 and the unmanned aerial vehicle 3 may be independently operating.

If the communication system 21 is mounted on the automatic guided vehicle 2, the communication system 21 may for instance be part of the communication module 22 of the automatic guided vehicle 2.

The communication system 21 may also be integrated in both the communication module 13 of the unmanned aerial vehicle 3 and the communication module 22 of the automatic guided vehicle 2. Each one of the automatic guided vehicle 2 and the unmanned aerial vehicle 3 may transmit some data of the remote server 100.

The inspection system 1 is further able to transmit to the remote server 100, via the communication system 21, a set of tridimensional coordinates associated with the measurement data.

The set of tridimensional coordinates comprises:
- a set of horizontal coordinates function of the bidimensional location of the automatic guided vehicle 2 in the horizontal plane H on the floor F of the storage facility 5, and
- a vertical coordinate function of the relative vertical distance of the unmanned aerial vehicle 3 with respect to the automatic guided vehicle 2.

The set of tridimensional coordinates thus indicates the specific physical location of the facility S associated with the measurement data.

In the present invention the unmanned aerial vehicle 3 thus doesn't need to perform a tridimensional positioning with respect to the storage facility S.

The communication system 21 may also be used to receive on the inspection system, information or instructions from the remote server 100, for example instructions to inspect a specific inspection area of the storage facility S.

The invention claimed is:

1. An inspection system for a storage facility, the storage facility having a floor extending along a horizontal plane, a vertical direction being perpendicular to said horizontal plane, the inspection system comprising:
    an automatic guided vehicle comprising
        a propulsion unit able to propel the automatic guided vehicle on the floor of the storage facility, and
        a bidimensional positioning system able to determine a bidimensional location of the automatic guided vehicle in the horizontal plane on the floor of the storage facility,
    an unmanned aerial vehicle comprising
        a propulsion unit able to propel the unmanned aerial vehicle and
        a measurement sensor able to acquire measurement data,
    wherein the inspection system further comprises:
        a position control system able to command the propulsion unit of the unmanned aerial vehicle to maintain said unmanned aerial vehicle substantially above the automatic guided vehicle in the vertical direction,
        an altitude sensor able to acquire relative vertical positioning data indicative of a relative vertical distance between the unmanned aerial vehicle and the automatic guided vehicle,
        a communication system able to transmit the measurement data to a remote server,
    wherein the inspection system is further able to transmit to said remote server a set of tridimensional coordinates associated with the measurement data, said set of tridimensional coordinates comprising a set of horizontal coordinates function of said bidimensional location of the automatic guided vehicle in the horizontal plane on the floor of the storage facility, and a vertical coordinate function of said relative vertical distance of the unmanned aerial vehicle with respect to the automatic guided vehicle.

2. The system of claim 1, wherein the position control system comprises:

a position control sensor able to acquire relative horizontal positioning data indicative of a relative position of the automatic guided vehicle with respect to the unmanned aerial vehicle in the horizontal plane, a computer able to receive said relative horizontal positioning data from the position control sensor and to command the propulsion unit of the unmanned aerial vehicle to maintain said unmanned aerial vehicle substantially above the automatic guided vehicle in the vertical direction.

3. The system of claim 2, wherein said position control sensor and said computer are onboard the unmanned aerial vehicle.

4. The system of claim 2, wherein said position control sensor comprises a camera, and wherein a reference target is mounted on the automatic guided vehicle, said reference target comprising a set of features visible to the position control sensor.

5. The system of claim 1, wherein the position control system comprises at least one gyroscope and/or accelerometer onboard the unmanned aerial vehicle, and wherein the position control system is able to stabilize a spatial orientation of the unmanned aerial vehicle, in particular a roll, a pitch and/or a yaw of the unmanned aerial vehicle.

6. The system of claim 1, wherein the measurement sensor of the unmanned aerial vehicle comprises an optical, laser, video or acoustic sensor, in particular wherein the measurement sensor of the unmanned aerial vehicle is a short range measurement sensor.

7. The system of claim 1, wherein the automatic guided vehicle is a forklift automatic guided vehicle, in particular wherein the reference target is provided on a platform mounted on at least one fork of said forklift automatic guided vehicle.

8. The system of claim 7, wherein said platform further is a landing platform for the unmanned aerial vehicle.

9. The system of claim 8, wherein the computer system of the automatic guided vehicle is able to command the propulsion unit of the automatic guided vehicle to travel automatically across an inspection area of the storage facility.

10. The system of claim 1, wherein the bidimensional positioning system of the automatic guided vehicle comprises:

at least one storage facility positioning sensor onboard the automatic guided vehicle able to acquire storage facility positioning data of the automatic guided vehicle in the storage facility, and a computer system onboard the automatic guided vehicle able to receive said storage facility positioning data and to determine a bidimensional location of the automatic guided vehicle in the horizontal plane on the floor of the storage facility.

11. The system of claim 10, wherein the position control system of the unmanned aerial vehicle is able to command the propulsion unit of the unmanned aerial vehicle to scan automatically a vertical extension of the inspection area of the storage facility above the automatic guided vehicle.

12. The system of claim 1, wherein the unmanned aerial vehicle is able to follow a movement of the automatic guided vehicle in the storage facility, in particular wherein the unmanned aerial vehicle doesn't perform a tridimensional positioning with respect to the storage facility.

13. A method for performing an inspection in a storage facility, the storage facility having a floor extending along a horizontal plane, a vertical direction being perpendicular to said horizontal plane, the method comprising:

providing an inspection system according to claim 1, propelling the automatic guided vehicle on the floor of the storage facility, propelling the unmanned aerial vehicle and maintaining said unmanned aerial vehicle substantially above the automatic guided vehicle in the vertical direction, acquiring measurement data by means of a measurement sensor of the unmanned aerial vehicle, determining a bidimensional location of the automatic guided vehicle in the horizontal plane on the floor of the storage facility, acquiring relative vertical positioning data indicative of a relative vertical distance between the unmanned aerial vehicle and the automatic guided vehicle, transmitting to a remote server said measurement data, and transmitting to said remote server a set of tridimensional coordinates associated with the measurement data, said set of tridimensional coordinates comprising a set of horizontal coordinates function of said bidimensional location of the automatic guided vehicle in the horizontal plane on the floor of the storage facility, and a vertical coordinate function of said relative vertical distance of the unmanned aerial vehicle with respect to the automatic guided vehicle.

14. The method according to claim 13, wherein maintaining said unmanned aerial vehicle substantially above the automatic guided vehicle in the vertical direction comprises:

acquiring relative horizontal positioning data indicative of a relative position of the automatic guided vehicle with respect to the unmanned aerial vehicle in the horizontal plane, and commanding the propulsion unit of the unmanned aerial vehicle to maintain said unmanned aerial vehicle substantially above the automatic guided vehicle in the vertical direction.

* * * * *